July 26, 1932.   P. J. ARMAGNAT   1,868,683
WEIGHING DEVICE FOR USE IN TRAVELING CRANES
Filed Jan. 14, 1931
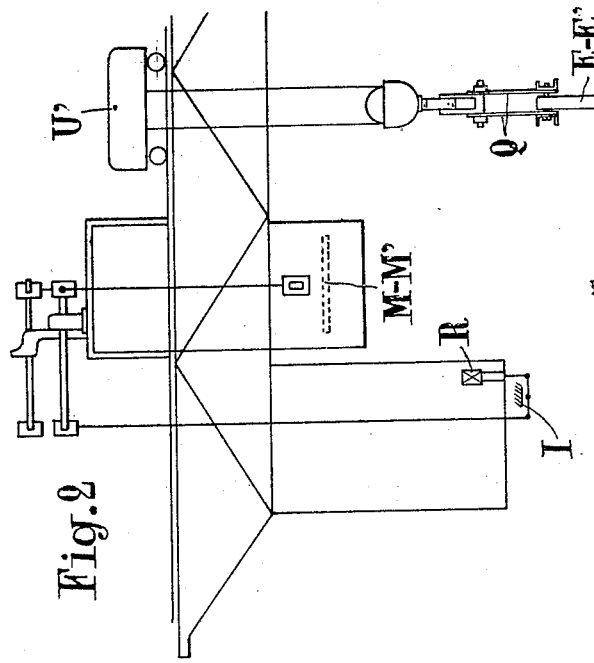
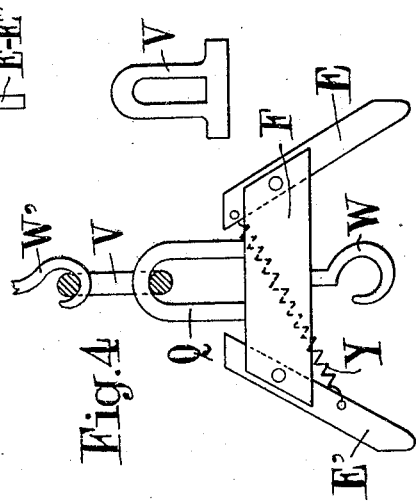
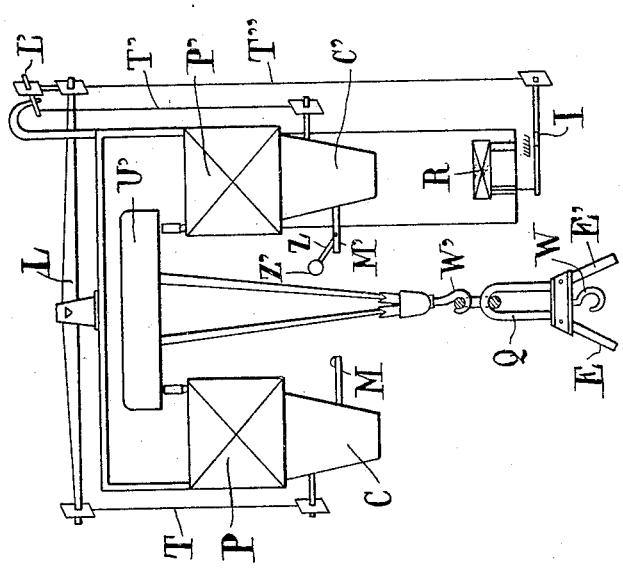
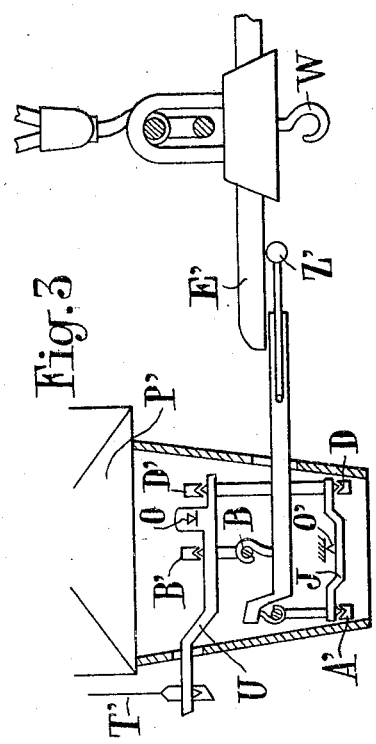
Inventor:
Pierre Jules Armagnat
By
Attorney

UNITED STATES PATENT OFFICE

PIERRE JULES ARMAGNAT, OF BETHUNE, FRANCE

WEIGHING DEVICE FOR USE IN TRAVELING CRANES

Application filed January 14, 1931, Serial No. 508,774, and in France January 18, 1930.

This invention relates to weighing devices for use in traveling cranes.

When it is desired to weigh the loads which are suspended to the hook of a traveling crane, this can be done in three ways only. The first way consists in mounting a weighing device between the hook of the lifting device of the crane and the load, said weighing device being provided at one end with a hook for the load. In this case the operator is compelled to practice very difficult and even dangerous gymnastics in the air and the weighing is always a long and uncertain operation, or it may be resorted to an automatic device, in which case the weighing operation may be rapidly performed, but of course it is far to be precise because of the difficulty encountered in reading the indications on the dial, which is far away. Furthermore, whether the device is or not automatic in operation, the knives are subjected to a very rapid wear and tear, because all the loads are suspended to the measuring device, even when they are not weighed.

The second way consists in interrupting the runway of the lifting device and letting said lifting device rest on or be suspended to a lever system connected to a weighing device. In both cases the load and the lifting device are weighed together and each passage of the crab on the interrupted runway contributes in wearing out the knives; therefore the precision of the weighing operations is diminished not only because the load to be weighed is small with respect to the whole load which is actually weighted and because the wear and tear of the knives takes place very rapidly, as above mentioned. On the other hand said method is applicable in certain particular cases only, because the runway of the crab must be in a high location, which is not frequently the case, and because the framework must permit the passage of the levers.

The third way consists in mounting a scale on the crab of the crane and in locating the whole lifting device on the plate of said scale so that the weighing operation may be effected at every point of the runway. This method has all the inconveniences of the other methods with respect to the lack of precision and to the wear and tear of the knives; furthermore it is absolutely necessary that the scale is provided for in the construction of the traveling crane.

The object of this invention is a new weighing method for traveling cranes which has not the inconveniences of the other systems, that is to say that the method according to this invention may be used on every existing traveling crane, furthermore that it is possible to weigh with said method the net load only, i. e. the load which is suspended to the hook and finally that it permits the entirely free use of the crane for all shifting operations which do not require weighing, without using the weighing device and also without the use of a wedge under the plate of the scale as in tipping cranes.

The principle of the invention is as follows. Under each girder supporting the rails of the runway for the lifting crab are placed two scale parts one in front of the other, each part comprising a casing suspended to a girder and multiplication levers engaging a power rod and an overhanging platform on the side of the casing.

In the cage, when it is fixed, and in the framework when the cage is movable, is located an indicating device of any type such as a Roman balance, a steel yard and the like.

A set of levers adapted not to reduce the useful stroke of the crab and therefore the range of action of the crane connects the power rod engaging the indicating device to both power rods coming from the levers which are located in the casings. This may be obtained by several methods and particularly by means of two levers swinging on fixed fulcrums on a portal mounted over the casing and over the cage, the feet of which portal extending outside from the outer part of the girders, while the cross pieces are located over the top of the crab.

With said disposition the utilization of the crane is by no means impaired nor altered and it can be used without the above described parts. When a load is placed on the platforms under the girders the operator may weigh said load from his cage or by bringing the cage in front of the indicating device.

With said device the loads suspended to the hook of the lifting device are weighed in the following manner. On the pulley block carrying the normal hook is fixed a member which will be termed hereinafter the cross member. Said member is provided with two arms having, when opened, an extended length which is greater than the distance between the platforms. The load is secured to a yoke which in turn is secured to the cross member and through the lifting movement in combination with the shifting movement the cross member is brought over the platforms and then lowered. By means of an articulated hand-rail carried by the platform on the cage side the arms of the cross member are extended during the lowering of said member and rest on the platform while the cross member is further lowered a small distance in order to maintain the cables always stretched; at this moment the net load increased by the very light weight of the cross member only rests on the scale and can be weighed.

In the drawing a form of execution of the invention applied to a fixed cage is shown by way of example.

Figure 1 is a sectional view of the crane with the location of the casings, the platforms, the hand-rail and the cross member. Figure 2 shows the same view in another position in order to show that invention does not require interrupting the runway.

Figure 3 shows the cross member and the pulley block in the weighing position. Figure 4 shows the cross member and its connection to the block.

Under the girders P and P' of the traveling crane are secured two casings C and C' from which extend two power rods T and T' and two platforms M and M'. An indicating device, for instance a Roman balance, is located as in R in the cage N.

The rods T and T' are connected by a third rod T'' by which a force is transmitted to the reversing lever I, said force being proportional to the sum of the strains exerted separately on the rods T and T'. Said connection may be obtained in several manners with the use of combinations of yokes and levers in a known manner. The form of execution shown for clearness sake comprises two beams L and L' swinging on bearings secured to a framework extending over the girders in order to permit the passage of the crab. Said beams are connected to the rod T'' through a double yoke.

Each casing C and C' contains a system of triangular and straight levers of suitable form in order to ensure the stability of the platform in spite of its overhanging position. The platform M is suspended to the knife B' of the beam U by means of a hook B and a yoke; on the other side the end of the platform which is opposite to the side which receives the load is maintained by a hook A connected by a yoke to the knife A' of the reversing beam J. Said beam J, which swings about an axis O' fixed with respect to the casing C, transmits the strains exerted in A' to the beam U by means of the knives D and D' connected together by a yoke. In order to ensure the stability of the platform the lever U is a triangular lever comprising two knives such as B' projecting on the same point on the figure which is a projection of the whole device in a vertical plane. The distance between the knives B' varies according to the width given to the edge of the platform. The beam U swings about an axis which is fixed with respect to the casing C. The leverages are so determined that the variation in the traction of the rod T and the variation in the load on the platform are proportional to each other in any location of the load on the platform. This may be obtained by connecting the leverages with the following relation:

$$\left(\frac{OB'}{OD'} = \frac{O'A'}{O'D}\right)$$

in which case the determination of the leverages is made as if the load applied at M were applied entirely onto the knife B'.

The cross member (Figure 4) substantially comprises a body F on which are secured a hook W which receives the load O', the place for the hook W' of the pulley block, a yoke Q in which the axis of the yoke V freely slides, a connecting piece between the hook W' and the cross member and finally the bolts of the arms E and E'.

The arms E and E' depend in their normal position as shown in Figure 4 and in this position the place which said arms require is less than the distance between the girders P and P' so that the cross member may pass between the girders without damaging them. The arms E and E' are connected together by a strong spring Y in order that when the arm E is lifted through the hand-rail Z' the other arm E' receives a symmetrical movement with respect to the middle plane of the crane.

The hand-rail Z with the roll Z' at one end is normally in the position as shown in the Figure 1. It may be turned upwards or downwards about an axis which is perpendicular to the plane of the drawing and maintained by a spring in the position shown. The roll Z' projects over the platform sufficiently for engaging with the arm E' of the cross member when the load is lifted.

The operation of the cross member is then as follows. When the load is lifted and when the cross member is brought over the platform and over the hand-rail, then on lowering of the same the arm E' engages with the roll Z' and on continuation of the lowering movement the body of the cross member alone is lowered, while the arm E' is set upright again, the arm E urged by the spring Y is also set upright again. When both arms are in their vertical position again the load lowers the roll Z' by pressing upon it; finally the arms E and E' rest on the platforms. At this time the current is interrupted on the lifting device by hand or by means of an automatical switch controlled by the lowering movement of the hand-rail, while the pulley block W' and the yoke V go on lowering until the drums of the winch are stopped. Said movement is possible, since the yoke V may slide axially in the yoke Q which is secured to the body of the cross member.

The load and the cross member may thus be weighed without any risk of error due to stretched cables, since the pulley rope is at this time entirely independent from the load and from the cross member, such result being attained without any risk of damaging the girders during the lifting period because of the arrangement of the hand-rail and of the articulated arms of the cross member.

Having now particularly described and ascertained the nature of my said invention, and in what manner the same is to be performed, I declare that what I claim is:

1. In a weighing device for traveling cranes having girders, two scale bodies mounted under each girder and comprising each a casing, levers and an overhanging platform connected to said levers by means of a particular system in order that the weighing operation may take place independently of the location of the load on the platform, a weighing device, and a power rod engaging therewith, the scale bodies being connected together by lever systems by which the transmission of the sum of the forces applied onto both platforms is ensured without any other force after a suitable application onto the power rod engaging with the weighing device.

2. In a weighing device according to claim 1, in combination, a movable hand-rail on one of the platforms and a cross member with articulated arms, said cross member being secured to the hook of the pulley block of the traveling crane by a yoke in which it may slide, the hand-rail being adapted to extend the arms when lowering the cross member over the platform, thus permitting the arms and the cross member which carries the load to rest upon the platforms under each girder, the sliding movement of the pulley block having no other effect than permitting the cables to remain stretched by the weight of the pulley block which is lowered in the yoke when the arms rest upon the platforms.

In testimony whereof I affix my signature.

PIERRE JULES ARMAGNAT.